Patented Jan. 2, 1945

2,366,683

UNITED STATES PATENT OFFICE 2,366,683

PREPARATION OF ORGANIC MERCURIC NITRATE

Harland H. Young, Chicago, Ill., assignor to Industrial Patents Corporation, Chicago, Ill., a corporation of Delaware No Drawing. Application February 19, 1942, Serial No. 431,495

6 Claims. (Cl. 260—433)

This invention relates to the synthesis of organic mercuric nitrates.

This application is a continuation in part of my co-pending application entitled Preparation of organic mercuric nitrate, Serial No. 301,954, filed October 30, 1939.

One of the objects of the invention is to provide a novel and less expensive method for the preparation of such compounds than is now employed.

Other objects of the invention will be apparent from the description and claims which follow.

Various organic mercuric nitrates are of technical importance, the most important of these compounds commercially being phenyl mercuric nitrate which is widely used in certain quarters for its bactericidal and disinfectant properties.

By way of illustration but not by way of limitation the present invention will be described as applied to the prepaartion of phenyl mercuric nitrate, which is an aryl mercuric nitrate.

Heretofore known synthesis for phenyl mercuric nitrate starts with the mercuration of benzene by means of mercuric acetate. The resultant phenyl mercuric acetate is converted to the phenyl mercuric chloride and thence to the nitrate.

Phenyl mercuric chloride is obtained from the acetate by reacting the acetate with calcium chloride in an alcohol solution, or by reducing the acetate to mercury diphenyl with sodium stannite and then reacting the mercury diphenyl with mercuric chloride in an acetone solution to give quantitative yields. The analogous preparation of phenyl mercuric nitrate from mercury diphenyl and mercuric nitrate cannot be effected in acetone solutions because of the insolubility of mercuric nitrate in this solvent. Mercury diphenyl has been reacted with oxides of nitrogen and mercuric nitrate alone, but the yields are not satisfactory.

A common method for converting phenyl mercuric chloride to phenyl mercuric nitrate is by means of alcoholic solutions of silver nitrate which is an expensive reagent and entails subsequent recovery of the silver, resulting in a high cost end product.

It has also been proposed to prepare phenyl mercuric nitrate by vigorously shaking a solution of diphenyl mercury in chloroform with an aqueous solution of mercuric nitrate. This method is not entirely satisfactory and the maximum yield which is obtainable is about 75 per cent.

In preparing phenyl mercuric nitrate by the present invention, benzene is mercurated with mercuric acetate, resulting in phenyl mercuric acetate. The phenyl mercuric acetate is reduced to mercury diphenyl, which is then quantitatively converted to phenyl mercuric nitrate by a solution of mercuric nitrate in acetone, water, and nitric acid.

In carrying out the present invention, the proper ratio of water, nitric acid, and acetone is, of course, maintained. It is well known that mercuric nitrate is insoluble in acetone, but is very soluble in water. In aqueous solutions, it decomposes to a basic nitrate unless nitric acid is present. Mercury diphenyl is soluble in acetone, but is insoluble in water. These facts have heretofore prevented the preparation of phenyl mercuric nitrate by the direct reaction of mercuric nitrate and mercury diphenyl.

The manner in which the present invention overcomes this difficulty will be clear from the following example:

Example 1 mol. of mercury diphenyl was dissolved in acetone to form a 90 per cent saturated solution. A solution was then prepared by dissolving 1 mol. of mercuric nitrate in a minimum quantity of water containing enough nitric acid to prevent the formation of a basic mercuric nitrate, and to dissolve any basic nitrate which may have been precipitated by the solution. The concentrated solution of mercuric nitrate in dilute nitric acid was then diluted with acetone until its volume was substantially equal to that of the mercury diphenyl solution. The two solutions were then mixed by stirring and warmed to 45 degrees C., whereupon phenyl mercuric nitrate began to precipitate in a short time, the reaction being substantially complete in thirty minutes and complete in one hour. After completion of the action, the material was cooled and the phenyl mercuric nitrate separated by filtration, some last traces being obtained by evaporating the mother liquor.

I have found in practice that from 0.1 per cent to 5 per cent nitric acid is sufficient to prevent the formation of a basic mercuric nitrate upon dissolving mercuric nitrate in water. I have also found that if turbidity occurs in the mercuric nitrate solution as acetone is added, small quantities of dilute nitric acid, that is, from 1 per cent to 5 per cent, may be added to avoid precipitation.

A reasonable range of temperature is permissible when the two solutions are mixed and warmed, the preferred range being between 40 degrees C. and 50 degrees C. It will be understood, of course, that the materials might be refluxed with equally satisfactory results.

It will be readily understood that the present invention in its broader aspects is not limited to the preparation of phenyl mercuric nitrate, but includes the preparation of compounds having the general formula RHgNO₃ where R is an aryl, substituted aryl, alkyl, substituted alkyl, or the radical from the R position of any mercury derivative having the general formula R₂Hg which is formed by the reduction of any mercuric acetate having the general formula RHgOOCCH₃

Examples of the various radicals or groups which are satisfactory for the purposes of the present invention are as follows:

Aryl groups which are satisfactory for the purposes of the present invention are the phenyl, naphthyl and phenanthryl groups. The naphthyl groups or radical may be either of the two isomers, and the phenanthryl radical may be any of the five isomers of this radical.

The following substituted aryl groups or radicals are satisfactory for the purposes of this invention: tolyl; ortho-, meta- and para-xylyl, or synonymously, dimethylphenyl; chlorophenyl, for example, parachlorophenyl; trinitrophenyl; trimethylphenyl; pentamethylphenyl; and ortho-, meta-, and para-biphenyl.

Alkyl groups which are satisfactory for the preparation of organic mercuric nitrates in accordance with the present invention include the following groups or radicals: methyl, ethyl, n-propyl, isopropyl, n-butyl, isobutyl, sec-butyl, tert-butyl, isopentyl, tert-pentyl, n-heptyl, n-octyl, and sec-octyl.

Substituted alkyl groups which are satisfactory for the purposes of the present invention are benzyl, phenacyl, and β-carboxyl ethyl and dicarbethoxy methyl.

It is apparent from the foregoing description that the method of this invention is not limited to the preparation of phenyl mercuric nitrate nor is it limited to the preparation of organic mercuric nitrates of the specific groups set forth. It is obvious that various modifications of the invention may be made without departing from the spirit and scope thereof.

I claim:
1. The method of preparing phenyl mercuric nitrate which comprises converting mercury diphenyl to phenyl mercuric nitrate by reacting mercury diphenyl with mercuric nitrate in a solution comprising acetone, water, and nitric acid in sufficient amount to prevent precipitation of basic mercuric nitrate, the proportion of acetone being sufficient to dissolve the mercury diphenyl.

2. The method of preparing phenyl mercuric nitrate which comprises reacting a solution of mercury diphenyl in acetone with a solution of mercuric nitrate in water and nitric acid in sufficient amount to prevent precipitation of basic mercuric nitrate.

3. The method of preparing phenyl mercuric nitrate which comprises reacting a solution of mercury diphenyl in acetone with a solution of mercuric nitrate in water and nitric acid in sufficient amount to prevent precipitation of basic mercuric nitrate by mixing the two solutions and heating until phenyl mercuric nitrate is precipitated.

4. The method of preparing phenyl mercuric nitrate which comprises reacting a solution of mercury diphenyl in acetone with a solution of mercuric nitrate in water and nitric acid in sufficient amount to prevent precipitation of basic mercuric nitrate by mixing the two solutions and heating to from 40 degrees C. to 50 degrees C.

5. The method of preparing phenyl mercuric nitrate which comprises reacting a solution of mercury diphenyl in acetone with a solution of mercuric nitrate in water and nitric acid in sufficient amount to prevent precipitation of basic mercuric nitrate by mixing the two solutions in the proportion of one mole of mercury diphenyl to one mole of mercuric nitrate, and heating until phenyl mercuric nitrate is precipitated.

6. The method of preparing phenyl mercuric nitrate which comprises reacting a solution of mercury diphenyl in acetone with a solution of mercuric nitrate in water and nitric acid in sufficient amount to prevent precipitation of basic mercuric nitrate by mixing the two solutions in the proportion of one mole of mercury diphenyl to one mole of mercuric nitrate, and heating from 40 degrees C. to 50 degrees C.

HARLAND H. YOUNG.